United States Patent [19]
Nicolle

[11] 3,739,403
[45] June 19, 1973

[54] PROSTHETIC JOINT HAVING A TISSUE INGROWTH PREVENTIVE CAPSULE

[76] Inventor: Frederick Villeneuve Nicolle, 35 Ossington St., London, England

[22] Filed: Oct. 4, 1971

[21] Appl. No.: 186,144

[30] Foreign Application Priority Data
Oct. 9, 1970 Great Britain.............. 48,206/70

[52] U.S. Cl.................. 3/1, 128/92 C, 128/DIG. 21
[51] Int. Cl. ............................................ A61f 1/24
[58] Field of Search............ 3/1; 128/92 C, 92 CA, 128/92 R, DIG. 21

[56] References Cited
UNITED STATES PATENTS
3,506,982   4/1970   Steffee ..................................... 3/1
3,462,765   8/1969   Swanson ................................... 3/1
3,593,342   7/1971   Niebauer ................................... 3/1

FOREIGN PATENTS OR APPLICATIONS
1,122,634   5/1956   France............................ 128/92 C Primary Examiner—Richard A. Gaudet
Assistant Examiner—Ronald L. Frinks
Attorney—Sewall P. Bronstein, John D. Woodberry and Robert F. O'Connell et al.

[57] ABSTRACT

A prosthetic joint comprises two relatively rigid intramedullary arms interconnected by an integral hinge portion to allow articulation of the arms. The hinge portion is located within a capsule of relatively resilient and deformable material which protects the hinge portion from ingrowing body tissues.

4 Claims, 3 Drawing Figures

PATENTED JUN 19 1973　　　　　　　　　　3,739,403

PROSTHETIC JOINT HAVING A TISSUE INGROWTH PREVENTIVE CAPSULE

The present invention relates to prosthetic joints for intramedullary insertion suitable for use, for example, in the joints of the hand or the elbow. Such prosthetic joints are used in surgery to replace joints diseased or damaged by, for example, arthritis or trauma.

The diseased joint ends are removed by surgery and the prosthetic joint inserted into the available space, immobilization being achieved by insertion of the prosthesis into the hollowed-out intramedullary space in the bone ends.

A known prostehtic joint is formed of a relatively soft and deformable material and consists of two intramedullary arms integrally formed with an enlarged center portion. The enlarged center portion provides a cushion to keep apart the cut bone ends between which the joint is fitted. The arms are freely fitted in the intramedullary space formed in the bone ends and for articulation of the joint reliance is placed on the piston action of the arms in the intramedullary space and the flexible nature of the joint over both the arms and the enlarged center portion.

It is an object of the present invention to provide a prosthetic joint which when fitted allows flexing and extending of the parts connected by the joint in a near-normal manner.

The present invention provides a prosthetic joint comprising relatively rigid intramedullary arms and a relatively resilient and deformable capsule to which the arms are fitted to extend outwardly therefrom, an axis of movement between the two arms being located within the capsule.

The arms may be interconnected within the capsule, in which case the axis of movement is constituted by a hinge provided by an integrally formed portion of reduced thickness interconnecting the two arms. The capsule prevents ingrowing body tissue from reaching the hinge and robbing the joint of movement.

It is preferred that the arms are detachably fitted to the capsule.

Advantageously, the wall of the capsule is formed with two outwardly-extending thick-walled portions each of which surrounds a corresponding opening in the wall which accommodates one of the arms. These thick-walled portions are, in use, adjacent the cut ends of the hollowed-out bone.

The arms are preferably formed of polypropylene and the capsule is of a silicone polymer, e.g. dimethyl polysiloxane.

The capsule may have small openings in its wall to allow, in use, passage of body fluids through the capsule.

The invention is particularly applicable to finger joints and can be used in both metacarpophalangeal and proximal interphalangeal joint replacement. However, the invention may also be applied to other joints such as the knee or elbow joints.

The invention will now be described by way of example only with reference to the accompanying drawings, in which.

The joint comprises a substantially spherical hollow capsule 11, which is resilient and deformable and is formed of dimethyl polysiloxane. Two outwardly-tapered arms 12 extend from the interior of the capsule 11 through openings 13. The openings 13 are surrounded by thick-walled extensions 14 of the capsule 11 which are aligned at an obtuse angle to one another.

Figure 2:
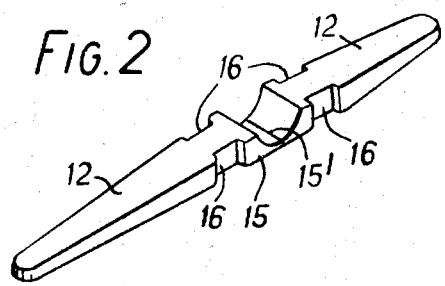
FIG. 2 is a perspective view of part of the joint shown in FIG. 1.

As shown in FIG. 2, the two arms 12 are integrally formed and interconnected by a flexible web 15 of reduced thickness which is adapted to flex about a central hinge line 15' at which its thickness is most greatly reduced. The arms 12 and the web 15 are formed of the relatively rigid material polypropylene. The arms 12 are aligned to one another at an obtuse angle similar to the angle between the extensions 14. Each arm 12 is formed with a reduced-width portion 16 with which the walls of the extensions 14 mate to locate the arms 12 with respect to the capsule 11. The arms 12 can be inserted into the capsule 11 by the introduction of the member shown in FIG. 2 through one of the openings 13, which as the material of the capsule 11 is relatively soft and flexible deforms to permit the passage of the said member.

Two small diametrically opposed holes 17 are provided in the wall of the capsule. In order to insert the prosthetic joint, the damaged joint is removed by surgery and the bone ends hollowed-out to receive the arms 12 with a snug fit that prevents rotation in the intramedullary space. The extensions 14 provide buttresses for the cut cone ends when the prosthetic joint is fitted. The capsule 11 protects the hinge between the arms 12 and prevents body tissues growing against the hinge. This ensures free movement of the hinge throughout its life and prevents contact between the moving hinge and the surrounding body tissue.

The two small holes 17 allow passage of body fluids through the capsule 11 but do not allow ingrowth of fibrous tissue.

In an alternative form of the joint, the capsule contains human body fluid or an artificial liquid or gel.

Figure 1:
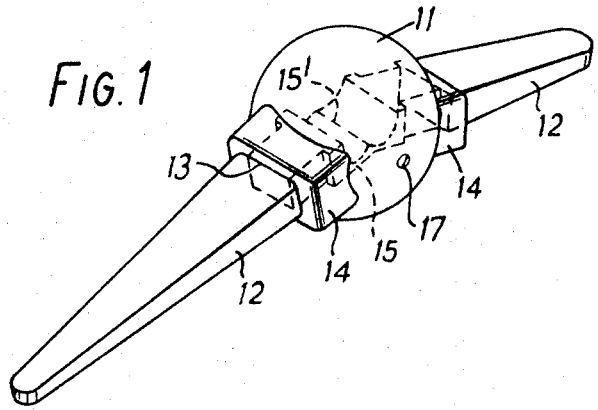
FIG. 1 is a perspective view of a prosthetic joint for a human finger.
Figure 3:
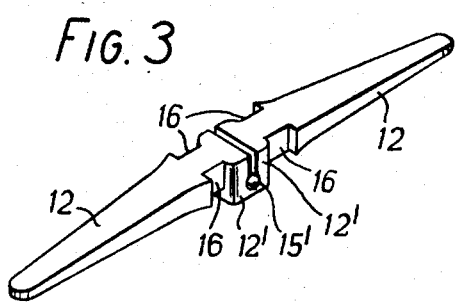
FIG. 3 is a perspective view of an alternative form of the part of the joint shown in FIG. 2.

FIG. 3 shows the two arms 12 and interconnecting portion of an alternative form of joint, in which the arms 12 and interconnecting portion are again formed of polypropylene. The part shown in FIG. 3 is fitted with a soft deformable capsule 11 of dimethylpolysiloxane which enclosed the interconnecting portion as described in connection with FIG. 1. The arms 12, are, as before, formed with reduced width portion 16 to locate them in the capsule 11. The inner ends of the two arms 12 are formed with abutment portions 12' which are interconnected by an integral portion 15 of reduced thickness which is offset from the two arms 12 i.e. if the two arms 12 are positioned in a straight line, the portion 15 lies off that line. The portion 15 has a line of minimum thickness 15', i.e. a line at which the web is thinnest, which provides a hinge line. In this form, however, the arms 12 can only move in one direction from their normal condition shown in FIG. 3. Movement in the other direction being prevented by the two inner surfaces of the portions 12' which are brought into contact when the arms are flexed in the said other direction.

It will be appreciated that the joint can be made in different sizes to meet surgical requirements and that, although the example described above is a joint for a human finger, joints embodying this invention can be used in many different situations, e.g. for the knee where this form of joint is required.

What I claim is:

1. A prosthetic joint comprising two intramedullary arms and an integrally formed interconnecting portion, said arms being relatively rigid and said interconnecting portion being of such reduced thickness as to provide a flexible hinge between said arms, said joint also including a relatively resilient and deformable capsule within which said interconnecting portion is located and outwardly from which said arms extend, whereby the flexible hinge is protected from ingrowing body tissues.

2. A prosthetic joint as claimed in claim 1 wherein said capsule has openings through which said arms extend and thick-walled outwardly extending portions surrounding said openings to provide buttresses for the cut bone ends between which the joint is adapted to be fitted.

3. A prosthetic joint as claimed in claim 1 wherein said inner ends of said arms are formed with abutment portions located on the two sides of the flexible hinge respectively, the abutment portions being joined by an offset integral web portion containing said interconnecting portion.

4. A prosthetic joint comprising two relatively rigid intramedullary arms and hinge means interconnecting said arms, said joint also including a relatively resilient and deformable capsule within which said hinge means is disposed and outwardly from which said arms extend, whereby the hinge means is protected from ingrowing body tissues.

* * * * *